United States Patent [19]
Yamada

[11] Patent Number: 5,659,759
[45] Date of Patent: Aug. 19, 1997

[54] DATA PROCESSING DEVICE HAVING IMPROVED INTERRUPT CONTROLLER TO PROCESS INTERRUPTS OF DIFFERENT PRIORITY LEVELS

[75] Inventor: Yasuo Yamada, Tokyo, Japan

[73] Assignee: Kabushiki Kaisha Toshiba, Kawasaki, Japan

[21] Appl. No.: 742,699

[22] Filed: Nov. 4, 1996

Related U.S. Application Data

[63] Continuation of Ser. No. 204,390, filed as PCT/JP93/01340, Sep. 20, 1993, abandoned.

[30] Foreign Application Priority Data

Sep. 21, 1992 [JP] Japan ..................... 4-251183

[51] Int. Cl.$^6$ ..................................... G06F 7/46
[52] U.S. Cl. ............................ 395/738; 395/735
[58] Field of Search ................................. 395/725

[56] References Cited

U.S. PATENT DOCUMENTS

| | | | |
|---|---|---|---|
| 3,905,025 | 9/1975 | Davis et al. ............................ | 395/725 |
| 4,636,944 | 1/1987 | Hodge ..................................... | 395/725 |
| 5,163,152 | 11/1992 | Okamoto ............................... | 395/725 |
| 5,404,537 | 4/1995 | Olnowich ................................. | 365/725 |

FOREIGN PATENT DOCUMENTS 61-214032  9/1986  Japan.

OTHER PUBLICATIONS

Ibaraki, LAPX86 Family User's Manual, Intel Japan, May 20, 1982, pp. 410–412.

*Primary Examiner*—Gopal C. Ray
*Assistant Examiner*—David A. Wiley
*Attorney, Agent, or Firm*—Foley & Lardner

[57] ABSTRACT

In order to delay, as far as possible, the time at which the interrupt request at the newest highest priority level is determined and to shorten the response time for an interrupt request with a high priority level, a microprocessor has control circuit 15, when an interrupt request is received, for inputting an interrupt priority level value obtained from a group of interrupt request signals IPL0# to IPL2 # simultaneously with the input of an interrupt vector for an interrupt request from a plurality of data buses D0 to D15, setting this interrupt level value in a mask register 13 as the mask level when the interrupt process is executed; and controlling a mask circuit 11 for masking an interrupt request of an interrupt priority level the same as or lower than an interrupt priority request level received during the execution of the interrupt process.

4 Claims, 5 Drawing Sheets

EXAMPLE OF INTERRUPT PROCESS STARTING PROCEDURES (1)

EXAMPLE OF INTERRUPT PROCESS STARTING PROCEDURES (2)

FIG.6

| INTERRUPT PRIORITY | LEVEL | EXTERNAL INTERRUPT LEVEL (INTERRUPT LEVEL INPUT THROUGH PIN) | | | | INTERRUPT MASK DATA (INTERNAL EXECUTION LEVEL SET IN STATUS REGISTER) | | | |
|---|---|---|---|---|---|---|---|---|---|
| | | $\overline{IPL}$ 2 | 1 | 0 | REQUEST INTERRUPT LEVEL | I2 (SRbit 10) | I1 (bit 9) | I0 (bit 8) | SET MASK DATA |
| HIGH | 7 | L | L | L | INTERRUPT REQUEST WHERE MASKING IS IMPOSSIBLE | 1 | 1 | 1 | INPUT REQUEST OF LEVEL 7 OR GRATER MASKED |
| ↑ | 6 | L | L | H | INTERRUPT REQUEST WITH POSSIBILITY OF MASKING | 1 | 1 | 0 | INTERRUPT REQUEST OF LEVEL 1 TO 6 MASKED |
| | 5 | L | H | L | | 1 | 0 | 1 | INTERRUPT REQUEST OF LEVEL 1 TO 5 MASKD |
| | 4 | L | H | H | | 1 | 0 | 0 | INTERRUPT REQUEST OF LEVEL 1 TO 4 MASKED |
| | 3 | H | L | L | | 0 | 1 | 1 | INTERRUPT REQUEST OF LEVEL 1 TO 3 MASKED |
| | 2 | H | L | H | | 0 | 1 | 0 | INTERRUPT REQUEST OF LEVEL 1 TO 2 MASKED |
| ↓ | 1 | H | H | L | | 0 | 0 | 1 | INTERRUPT REQUEST OF LEVEL 1 MASKED |
| LOW | 0 | H | H | H | INTERRUPT REQUEST DOES NOT OCCUR | 0 | 0 | 0 | INTERRUPT REQUEST NOT MASKED |

DATA PROCESSING DEVICE HAVING IMPROVED INTERRUPT CONTROLLER TO PROCESS INTERRUPTS OF DIFFERENT PRIORITY LEVELS

This application is a continuation, of application Ser. No. 08/204,390, filed as PCT/JP93/01340, Sep. 20, 1993, now abandoned.

TECHNICAL FIELD

The present invention relates to an interrupt processing starting method for a data processing device, such as a microprocessor or the like, with a plurality of interrupt priority levels, and, in particular, to a data processing device in which the amount of hardware in the configuration is reduced and the amount of electrical energy consumed is restrained as the result of automatically setting an interrupt mask level when executing interrupt processing programs corresponding to received interrupt causes, while, at the same time, simplifying a priority order mediation circuit or the like for an interrupt controller.

BACKGROUND ART

Use of an interrupt mechanism provided with a plurality of priority levels is an extremely powerful and important technology for swiftly coping with interrupt processing at a very high rate of urgency from within a program for processing a large number of interrupt causes. In the same manner, a vector interrupt mechanism whereby an interrupt reception bus cycle is executed, an interrupt vector for identifying the device requesting interrupt processing is input, and branching to a processing routine corresponding to the interrupt main cause received from this vector value occurs, after an interrupt is received, is also an important technology.

These interrupt mechanisms are currently provided in most high performance microprocessors. When an interrupt vector is not introduced into an interrupt reception bus cycle it is not possible to specify the device requesting the interrupt. In order to specify the device requesting the interrupt within the interrupt process program these devices must be polled, one at a time. This is extremely time-consuming, therefore the response time for handling an interrupt is greatly increased.

The above-mentioned interrupt mechanism provided with a plurality of priority levels and the vector interrupt mechanism, for example, are contained in the 68000 microprocessor manufactured by the Motorola Company. A general outline of the response procedures in a data processing device with a 68000 microprocessor is as follows.

(1) Interrupt request is received.

(2) Interrupt receipt bus cycle (interrupt acknowledge cycle) is executed.

(3) Interrupt vector is received (introduced).

(4) Address of interrupt processing program is determined by referencing a table from the vector value.

(5) Branching to interrupt processing program is executed.

FIG. 5 is a detailed flowchart of the above-mentioned interrupt response procedures, specifically, an interrupt processing exception sequence. In Step S102 in this diagram, the value of PC-2 indicates the lead instruction which is to be next executed when there is no external interrupt. Specifically, this value indicates the set value for the program counter. During the course of the above-mentioned processing steps (1) to (5) for the response sequence, the necessary processing for exiting the internal conditions of the microprocessor which exist immediately prior to an interrupt and the like is executed. However, this is not an essential item as far as the present invention is concerned, and explanation is therefore omitted here.

However, when a processing program corresponding to that interrupt is executed using an interrupt mechanism provided with a plurality of priority levels, it is usual for an interrupt mask level to be set automatically, depending on the priority level of the received interrupt. The above-mentioned Motorola 68000 microprocessor is provided with interrupt levels from level 0 to level 7 as shown, for example, in FIG. 6, and execution is performed in Step S104 as shown in FIG. 5.

Using an interrupt mask level, if the degree of priority is the same as the mask level, interrupt requests with a lower priority level are ignored, specifically, are masked. Accordingly, if the priority level of the interrupt request just received is set as the mask level, interrupt requests of the same priority level and interrupt requests of a lower priority level are ignored. Even in the case where the device which had received the interrupt continues to output a request, the request is ignored, therefore this is extremely convenient because multiple requests are not accepted. Also, it is extremely convenient to have the received interrupt priority level set as a mask level because the next interrupt request from among a plurality of interrupt requests of the same priority level is to be executed after the processing of the initially received interrupt request is completed.

With a 68000 microprocessor, for example, a priority level 7 only is handled as an exception, and the configuration is such that an interrupt request of a priority level the same as the interrupt mask level is only received and used as a mask impossible interrupt. This method of setting the interrupt mask level is an extremely superior method, but there is one problem. Specifically, it is necessary to return back to a microprocessor an interrupt vector corresponding to an interrupt cause which is in agreement with the received interrupt priority level.

Because the address of the interrupt processing program is calculated from the interrupt vector, the interrupt vector, which is input to the microprocessor during the interrupt reception bus cycle or is provided by an interrupt controller or an interrupt request device, is seen to be not necessarily structured to correspond to an interrupt cause in agreement with the received priority level. Rather, in the case where an interrupt request is generated with a higher priority level than the received interrupt request, an interrupt vector is input which corresponds to a newly generated interrupt request at a higher priority level. A method of responding to this newly generated, high priority level interrupt request is desired.

However, this presents a problem. This is because the interrupt vector is determined during the interrupt reception bus cycle, and the interrupt mask level used in the interrupt processing routine is used for the initially received interrupt request.

In actual practice, only a short time is available after the microprocessor receives the interrupt until the interrupt reception bus cycle is executed. As shown in FIG. 5, using the 68000 microprocessor as an example, the interrupt reception bus cycle is executed (Step S107) after the lower order two bytes of the program counter are removed to a stack (Step S105). Also, in other types of microprocessors, an instruction prefetch is executed asynchronously with the interrupt reception. In this case, the progress of the executed bus cycle is not halted when the interrupt is received. These bus cycles are normally completed within several clock cycles, but, for example, there are cases in which there is a waiting time of several tens of clock cycles or more when there is competition with a refresh operation for a dynamic memory used for the main storage and with another bus master in a multiprocessor.

In general, the interrupt request signal can be varied frequently and at any time, and there is no guarantee that the interrupt request signal at the instant when the interrupt is received will be completely in agreement with the interrupt request signal at the instant when the interrupt reception bus cycle is executed. The interrupt request from the interrupt requesting device is arbitrated by the interrupt controller to determine the interrupt with the highest interrupt level, and this can vary frequently and at any time.

In the case where the input of an interrupt vector corresponding to an interrupt of the received priority level is a prerequisite, as with the 68000 microprocessor, the interrupt controller must not merely find an interrupt of the highest priority level at a certain instant, but must find the interrupts positioned in the greatest priority sequence from among the interrupt requests of the same interrupt priority level as that received by the microprocessor, specified when the microprocessor executes the interrupt reception bus cycle (in the case of the 68000 microprocessor, output on address buses A1 to A3). (Care must be taken in the case where a plurality of interrupt causes jointly have the same interrupt priority level). This places an extremely large burden on the interrupt controller, and requires a complicated configuration.

In addition, after the instant when an interrupt is received, if an interrupt request signal is generated which has an even higher priority level, the interrupt request with this newly generated high priority level is deferred (irrespective of how high a priority level it has). Specifically, when control is shifted to an interrupt processing program corresponding to an interrupt request received a short time previously, there is a waiting period until an interrupt with a priority level higher than the mask level used at this time is received. After an interrupt is received, several tens of clock cycles are generally necessary until the start of the execution of the interrupt processing program, in order to process the withdrawal from the internal conditions of the microprocessor. Accordingly, it is desirable that the interrupt request at the highest priority level be determined immediately before this interrupt request is transmitted to the microprocessor, specifically, immediately before the interrupt vector is provided in the interrupt reception bus cycle.

In this case, the microprocessor must be provided with a configuration which can cope with the condition where the interrupt received by the microprocessor and the interrupt vector input to the interrupt reception bus cycle are not in agreement. However, this non-agreement is a fatal problem for the 68000 microprocessor, for example, because the received priority level is set as the interrupt mask level. However, this problem is not acknowledged.

As outlined in the foregoing, in a conventional data processing device provided with a mechanism for automatically setting the interrupt priority level as the interrupt mask level (used with the interrupt processing program), when the interrupt vector is provided to the microprocessor, an interrupt cause corresponding to a priority level set by the microprocessor (the received interrupt level being set) is sought, and an interrupt vector must be provided to cope with this. This results in the drawback whereby the priority ranking order mechanism of the interrupt controller becomes extremely complicated.

In addition, because the time at which the interrupt is received corresponds with an interrupt at the highest priority level, this interrupt is executed after the execution of the interrupt request with the high priority level, even if an interrupt request with a priority level higher appears immediately afterward. Specifically, because a decision must be made as to which interrupt request has the highest priority must be made in an unnecessarily short time, there is the drawback that the response time for an interrupt request with a higher priority level is delayed longer than necessary (is postponed).

DISCLOSURE OF INVENTION

Accordingly, an object of the present invention is, with due consideration to the drawbacks of such conventional devices, to provide a data processing device wherein the time at which an interrupt request at the highest priority level is concluded can be delayed as far as possible, for example, by making the decision immediately prior to providing the interrupt vector in the interrupt reception bus cycle, and wherein it is possible to have a short response time for an interrupt request with a high priority level.

A further object of the present invention is to provide a data processing device wherein the priority ranking mediation circuit is simplified, and wherein the amount of necessary hardware making up the interrupt controller is reduced and the amount of electrical energy consumed by the interrupt controller is cut back.

These objectives are achieved in the present invention by the provision of a data processing device, as shown in FIG. 1, comprising input means IPL0# to IPL2# for inputting an externally-supplied interrupt request which is set at one interrupt priority level from among a plurality of interrupt priority levels; interrupt masking means 11 for masking interrupt requests, set either to not mask all interrupt requests at all priority levels among the plurality of interrupt priority levels, or set so that interrupt requests from the low priority level to an optional priority level among the plurality of interrupt priority levels are ignored; mask level maintaining means 13 for maintaining a maximum interrupt priority level which is masked by the interrupt masking means 11; control means 15 for executing interrupt process starting procedures containing a step for receiving an interrupt request when the interrupt request input by the input means IPL0# to IPL2# is at a higher level than the mask level maintained by the mask level maintaining means 13; and a step for accepting an interrupt vector which indicates the received interrupt priority level, executes an interrupt receipt bus cycle and can at least identify the origin of the interrupt request for an interrupt request with a priority level the same or higher than that priority level, wherein the control means 15 controls so that, during the interrupt receipt bus cycle execution, the interrupt priority level value provided from the input means IPL0# to IPL2# is input at the same time as the interrupt vector is accepted, this interrupt priority level value is set in the mask level maintenance means 13 as the mask level used during the interrupt processing execution, and interrupt requests with a priority level the same or lower than an interrupt request priority level received during the interrupt process execution are masked.

With the data processing device of the present invention with the above-described configuration, the control means 15 executes interrupt process starting procedures which include a step for receiving an interrupt request when the interrupt request input by the input means IPL0# to IPL2# is at a higher level than the mask level maintained by the mask level maintaining means 13; and a step for accepting an interrupt vector which indicates the received interrupt priority level, executes an interrupt receipt bus cycle, and can at least identify the origin of the interrupt request for an interrupt request with a priority level the same or higher than that priority level. In addition, the interrupt controller circuit is simplified and the response time for interrupt requests with a high priority level is shortened by delaying as far as possible the time at which an interrupt request at the highest priority level is concluded.

Specifically, the interrupt request of the highest priority level is always determined by the interrupt controller, so that the mediation result immediately prior to the provision of the interrupt vector by the interrupt reception bus cycle can be used. There is a problem at this time with automatically setting the mask level for the interrupt processing program indicated by the interrupt vector. However, the data processing device deals with this by using the priority level value of an interrupt request which is sampled at the same time as the interrupt vector and corrected. For this reason, when the interrupt receipt bus cycle is executed, the control means 15 inputs the interrupt priority level value provided by the input means IPL0# to IPL2# at the same time as the interrupt vector is accepted. The control means 15 then sets this interrupt priority level value in the mask level maintenance means 13 as the mask level when the interrupt processing is executed for masking an interrupt request of a priority level the same as or lower than the interrupt priority level received during execution of the interrupt process.

The input of the interrupt vector by the data processing device signifies a response to the interrupt. It is not possible to change the interrupt being processed after the input of the interrupt vector. Accordingly, mediation of the priority ranking is allowed up to just prior to the input of the interrupt vector, and the time at which an interrupt request at the newest highest priority level is determined can be delayed as far as possible by the action of inputting the priority level of a higher interrupt request at the same time as inputting the interrupt vector.

In this manner, an interrupt processing starting method is provided for a data processing device in which the response time for an interrupt request with a high priority level is shortened. In addition, the priority ranking mediation circuit in the interrupt controller is simplified, the amount of necessary hardware making up the interrupt controller is reduced, and the amount of electrical energy consumed by the interrupt controller is cut back.

BRIEF DESCRIPTION OF DRAWINGS

FIG. 6 is an explanatory diagram for interrupt levels for a conventional data processing device.

BEST MODE FOR CARRYING OUT THE INVENTION

An embodiment of the present invention will now be explained with reference to the drawings.

Figure 1:
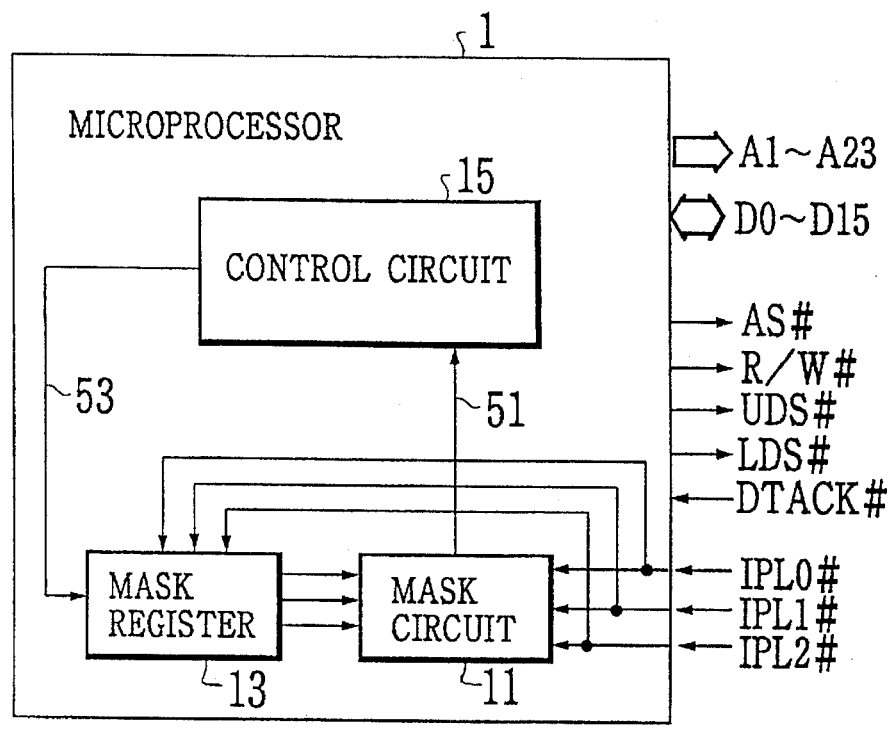
FIG. 1 is a diagram showing the configuration of a data processing device relating to an embodiment of the present invention.

FIG. 1 is a diagram showing the configuration of a data processing device relating to an embodiment of the present invention.

As shown in FIG. 1, the data processing device of this embodiment (hereinafter referred to as a microprocessor) is connected to various peripheral devices and an interrupt controller and the like through interface signals having signals on address buses A1 to A23, signals on data bus D0 to D15, a bus control signal group, and an interrupt request signal group IPL0# to IPL2#. The signals in the bus control signal group include an address strobe signal AS#, a read-write signal R/W#, a higher order data strobe signal UDS#, a lower order data strobe signal LDS#, and a data acknowledge signal DTACK#. In addition, three lines for the interrupt request signals IPL0# to IPL2# are used for showing that there is an interrupt request from an external device for the microprocessor 1. This embodiment has interrupt request levels for degrees of priority from a level 1 to a level 7. The symbol # appended to the signal names shows that these are negative logic signals.

In addition, the internal configuration of the microprocessor 1 of the present embodiment has a mask circuit 11 for selectively masking one portion of the interrupt requests input by means of the interrupt request signals IPL0# to IPL2# (or not masking at all); a mask register 13 for holding the maximum priority level to be masked; and a control circuit 15 for receiving a priority interrupt signal 51 which indicates an interrupt of a priority level higher than the mask level of the mask register 13, as a result of masking by the mask circuit 11, and controlling one portion of the processing relating to the interrupt reception.

Figure 2:
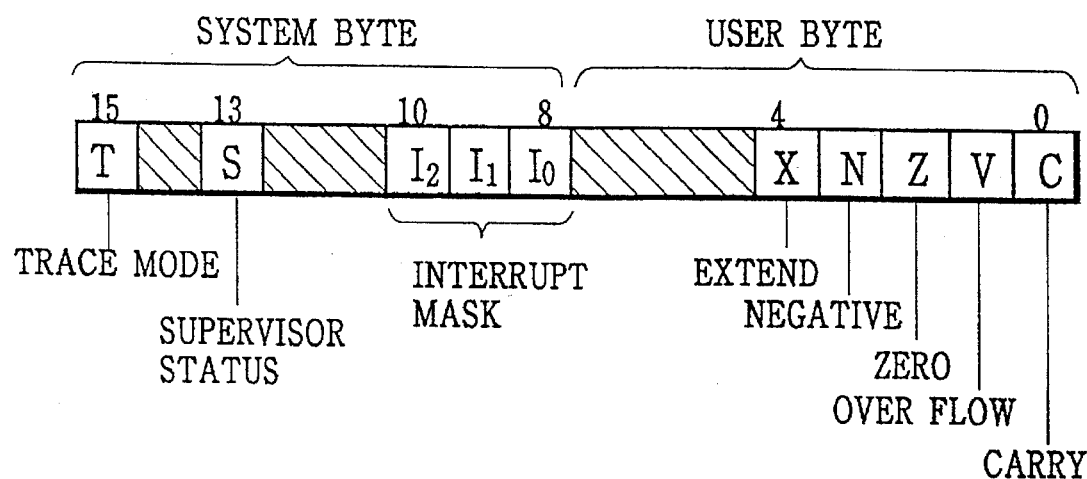
FIG. 2 is a diagram showing the bit configuration of a PSW (Processor Status Word) in the data processing device shown in FIG. 1.

The control circuit 15 receives the priority interrupt signal 51, generates a mask level input signal 53 for the mask register 13, and introduces an interrupt request level, which has been input by the interrupt request signals IPL0# to IPL2#, to the mask register 13. The mask register 13 may also be included in a register, referred to as a PSW (Process Status Word) in which are concentrated bits for controlling various operations of the microprocessor 1. FIG. 2 shows an example of the configuration of a PSW.

An interrupt mechanism, providing a plurality of priority levels, and a vector interrupt mechanism are provided in the microprocessor 1 of the present embodiment. The interrupt priority levels are from level 1 to level 7 (level 0 indicates that there is no interrupt request). Level 1 is the lowest, while level 7 is the highest priority level. The operating states of these mechanisms will now be explained from interrupt process starting procedures shown in FIG. 3.

First, "2" is set by the microprocessor 1 as the mask level for the mask register 13 (Step SP1). In this case, an interrupt request of a low priority level of "1" or "2" is masked. Such an interrupt request is therefore ignored and not accepted. Specifically, such low priority interrupt requests must wait until it becomes unnecessary to mask an interrupt of a low priority, specifically, until the processing of high priority interrupts is completed based on the progression of the program in the microprocessor 1.

Next, an interrupt request signal from a peripheral device A is input to the interrupt controller (Step SC1), the priority ranking is mediated by the interrupt controller, and the priority level of an interrupt request input with the highest priority level (in this case there is only one input and the highest priority level is level 3) is transmitted to the microprocessor 1 as an interrupt request (Step SC2).

In the microprocessor 1, the input interrupt request priority level (=3) is judged by the mask circuit 11 to be larger than the mask level, and a transmission is made to the control circuit is by means of the priority interrupt signal 51 which shows that there is an interrupt. The interrupt request is received by the control circuit 15 at a specified timing during a break in the instructions or the like (Step SP2). Then, the peripheral device and the interrupt controller are advised that an interrupt request has been received, and an interrupt reception bus cycle is executed (Step SP3). This step is performed so that an interrupt vector is received to identify the device which has requested the interrupt (advising the address of the interrupt processing program). At this time, the received interrupt priority level (=3) is output to a plurality of address buses A1 to A23.

In response to this, the interrupt controller outputs an interrupt vector assigned exclusively to the peripheral device A to a plurality of data buses D0 to D15 (Step SC3), the microprocessor 1 takes in the interrupt vector which is on the data buses D0 to D15 (Step SP4), and transfers control to the interrupt process program (Step SP5). Simultaneously with the input of the interrupt vector, the interrupt request level value (=3) output by the interrupt request signals IPL0# to IPL2# is also input, and this value is set in the mask register 13 as the mask level by the interrupt process program. Specifically, this interrupt request level value is input to the mask register 13 when the mask level input signal 53 is provided from the control circuit. As a result, interrupt requests lower than an interrupt request with a priority level exceeding "3", which is the priority level of this device, are masked by the interrupt processing program of the peripheral device A. Specifically, these requests are ignored.

Figure 3:
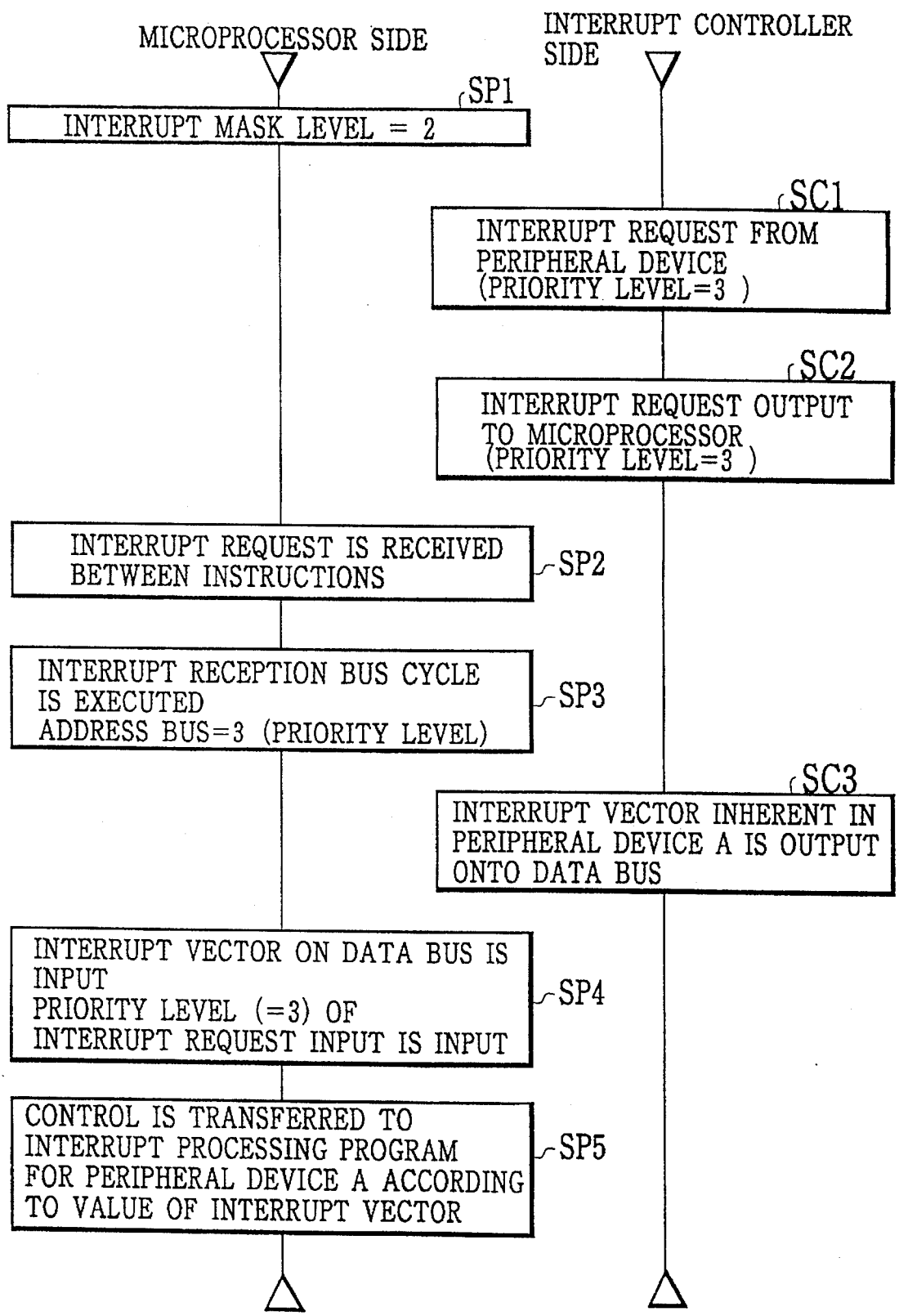
FIG. 3 is a flowchart showing the interrupt process starting procedures for the data processing device shown in FIG. 1 (in the case where the highest priority level when an interrupt is received and the highest priority level when an interrupt vector is input are the same).
Figure 4:
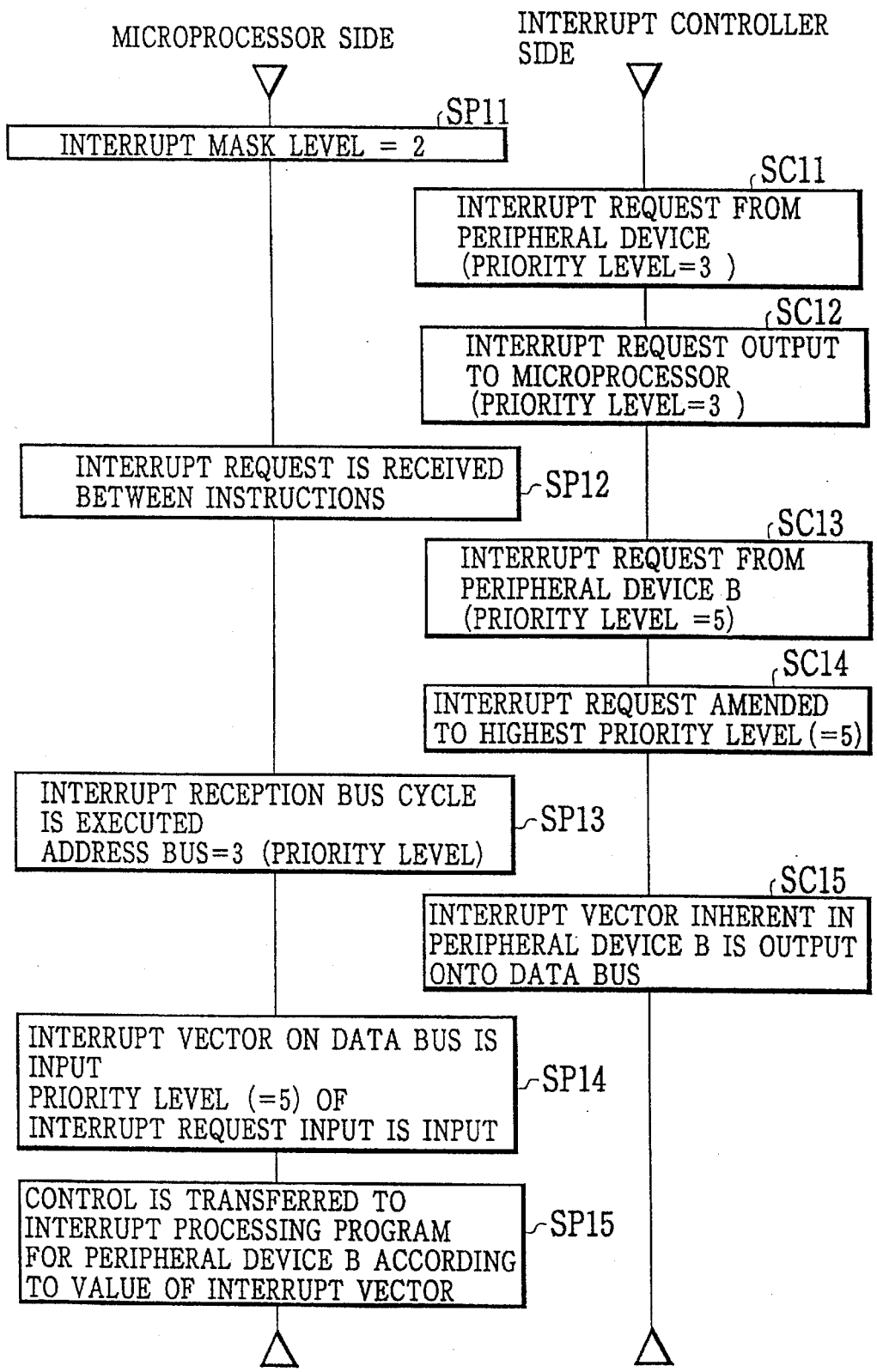
FIG. 4 is a flowchart showing the interrupt process starting procedures for the data processing device shown in FIG. 1 (when the highest priority level is changed after an interrupt request is received).
Figure 5:
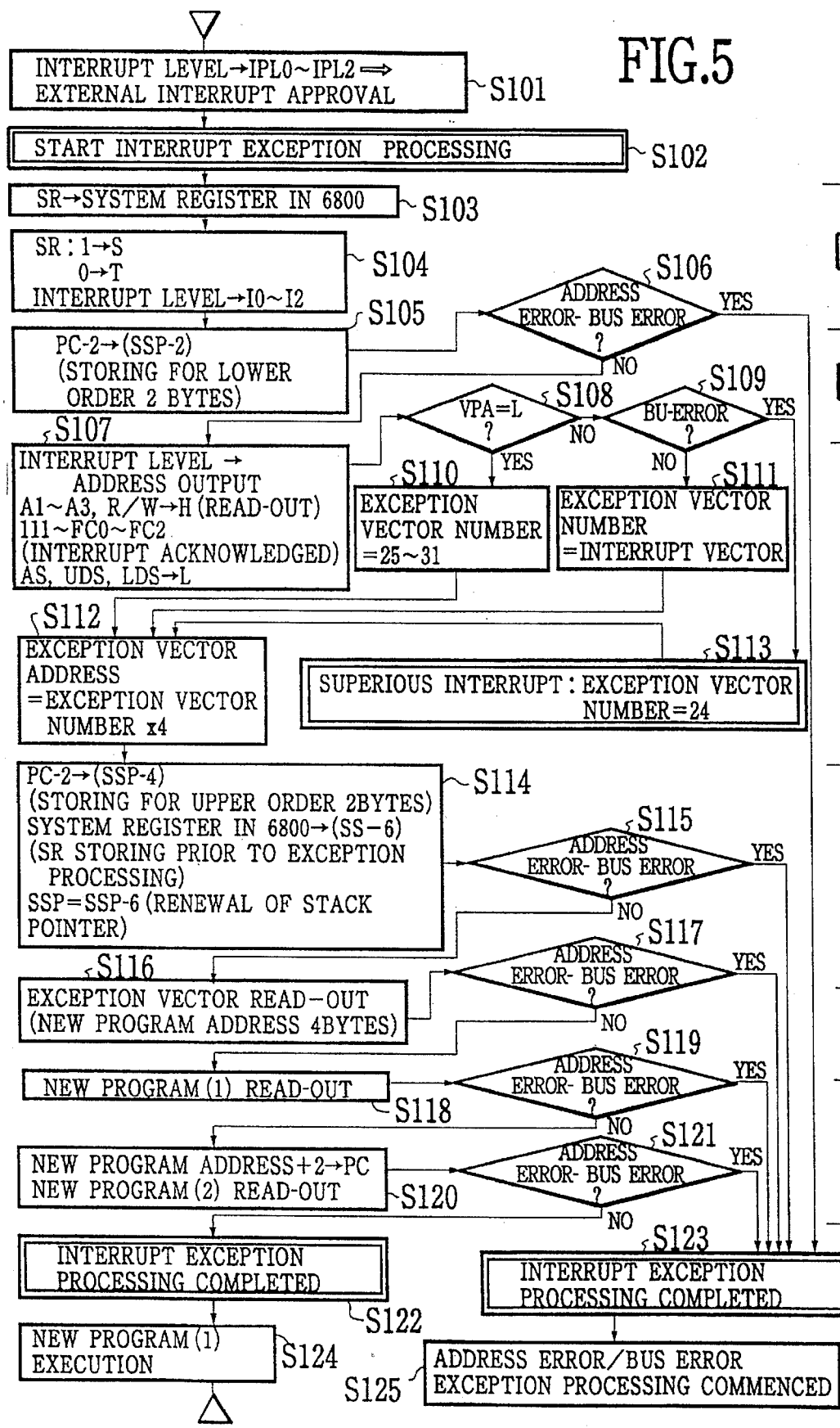
FIG. 5 is a flowchart showing interrupt exception processing procedures for a conventional data processing device.

In the case of FIG. 3, the maximum priority level when the interrupt is received and the maximum priority level when the interrupt vector is input are the same. Accordingly, in the same manner as in the conventional example, even if the maximum priority level when the interrupt is received acts as the mask level of the interrupt process program, no particular inconvenience arises. However, with an actual microprocessor, the internal conditions of the microprocessor (for example the contents of a general purpose register, the contents of a program counter, and the like) must be maintained when the interrupt is received for a microprocessor which is dependent upon a program being processed, and the contents of the preserved internal conditions must be restored on returning from the interrupt processing program, so that the original processing is continued without delay. Accordingly, after receipt of the interrupt request, the interrupt receipt bus cycle, specifically, the received interrupt request, is not always executed immediately. In the interval, it can be considered that an interrupt request signal from another peripheral device is input to the interrupt controller, and the highest priority level is changed. The action in this case will now be explained with reference to the interrupt process starting procedures shown in FIG. 4.

First, "2" is set by the microprocessor 1 as the mask level for the mask register 13 (Step SP11). An interrupt request signal from the peripheral device A is input to the interrupt controller (Step SP11), the priority ranking is mediated by the interrupt controller, and the priority level of an interrupt request input with the highest priority level (level 3) is transmitted to the microprocessor 1 as an interrupt request (Step SC12). In the microprocessor 1, the input interrupt request priority level (=3) is larger than the mask level, therefore the control circuit 15 receives the interrupt request at a specified timing during a break in the instructions or the like (Step SP12).

However, there are cases in which some time elapses until the interrupt reception bus cycle has been executed. In addition, when an interrupt request is generated from a peripheral device B within an extremely small time interval, there is concern that the highest priority level will change in the interval from receipt of the interrupt until the interrupt reception bus cycle. For example, as in Step SC13 shown in FIG. 4, there is the case where an interrupt request is generated from the peripheral device B with a priority level (level 5) which is higher than that from the peripheral device A, and the highest priority level of the mediation circuit (omitted from the drawing) is changed to "5" (Step SC14), which is relevant to this case. In such a case, because the priority level of the initially received interrupt request is "3", "3" which is the priority level of the received interrupt request is loaded onto the address buses A1 to A23 in the interrupt reception bus cycle, indicating that the received interrupt request is at level 3 (Step SP13).

Responding to this interrupt reception bus cycle, the interrupt controller outputs an interrupt vector assigned exclusively to the peripheral device B which has an interrupt request of level 5 to the data buses D0 to D15, in response to an interrupt of level 5 which is the maximum priority level at this time (Step SC15).

The microprocessor 1 inputs the interrupt vector on the data buses D0 to D15 (Step SP14), and transfers control to the interrupt processing program used for the peripheral device B which has requested an interrupt of a higher priority level (Step SP15). In addition, simultaneously with the input of the interrupt vector, the interrupt request level value (=5) input by means of the interrupt request signals IPL0# to IPL2# is introduced and this value is set in the mask register 13 as the mask level for the interrupt processing program used with the peripheral device B.

Here, the initial interrupt priority level received is "3", but the point at which "5", which is the interrupt priority level input simultaneously with the interrupt vector, is important. Specifically, any interrupt request which is lower than an interrupt request exceeding "5", which is the priority level of this device, is masked in the interrupt processing program for the peripheral device B.

In order to compare this embodiment of the present invention with a conventional example, the problem areas created when "3", which is the priority level value initially received, is set as the mask level without using the method of this embodiment will now be considered.

In the interrupt processing program for the peripheral device B, it is known that an interrupt priority level of "5" is assigned and interrupts of a priority level less than 5 are not handled. Specifically, it may be coded as a prerequisite that no interruption occurs for an interrupt request of a priority level less than 5. In this case, there is the possibility of interrupts of the priority levels 4 or 5 being received to execute a program assigned to the priority level 5 at a mask level of 3 so that an unforecast situation develops.

In addition, in an interrupt request once generated by the peripheral device B, a specified process in the interrupt processing program for the peripheral device B is executed, and not releasing is also considered only when the cause of the interrupt is not removed. In this case, an interrupt request from this same peripheral device B (priority level 5) is received immediately after the execution of the interrupt processing program used for the peripheral device B is commenced at the mask level 3. Specifically, this results in the interrupt request from the peripheral device B being received a second time, in error.

In order to avoid this type of problem, a conventional microprocessor has a configuration whereby it is not possible to respond to an interrupt of a priority level which is different from the priority level initially received. Accordingly, the interrupt controller must locate an interrupt request which agrees with the priority level shown in the interrupt reception bus cycle. This part of the configuration therefore becomes complicated. In addition, even when an interrupt request of a higher priority level is generated, there are cases generated in which the response time for the interrupt request with a high priority level is extended longer than necessary because an immediate response is not allowed by this configuration, which is a problem.

As opposed to this, with the interrupt processing starting method of the microprocessor of the present configuration, the interrupt request level value input from the input means IPL0# to IPL2# is also introduced to the microprocessor 1 at the same time as the interrupt vector carried on the data buses D0 to D15. This interrupt priority level value is set as the mask level for the subsequently executed interrupt processing program, therefore the problems occurring with the above-described conventional microprocessor can be easily eliminated.

In addition, with the interrupt processing starting method of the microprocessor of the present invention, although a configuration equivalent to the conventional example can be provided, the priority level of the interrupt request input is merely resampled, therefore the processing procedures are not particularly complicated and various types of problems can be eliminated. This process has the special feature that there is absolutely no necessity to increase the number of clock cycles required to start the interrupt process. This is the most prominent feature of this method. In addition, by adopting the interrupt processing starting method which constitutes the above-mentioned embodiment, the microprocessor uses the interrupt controller to locate an interrupt request in agreement with a priority level set in the peripheral devices generating interrupt requests, therefore processing requiring a large amount of elapsed time and a complicated mechanism is unnecessary. Accordingly, the priority ranking mediation circuit (omitted from the drawings) of the interrupt controller can be simplified, and it is possible to reduce the amount of hardware required in the configuration. It is therefore possible to reduce the power consumption.

Further, the response time for high priority level interrupt requests can be shortened. From these effects, it is possible to improve the processing performance from the aspect of a total microprocessor system, and the application range of the microprocessor and the peripheral devices can be extended.

INDUSTRIAL APPLICABILITY

By means of the present invention, as outlined above in detail, the interrupt priority level value provided from the interrupt request signals is input during the interrupt receipt bus cycle execution at the same time as the interrupt vector is introduced, and this interrupt priority level value is set in the mask level maintenance means as the mask level used during the interrupt processing execution. Furthermore, interrupt requests with a priority level the same or lower than an interrupt request priority level received during the interrupt process execution are masked, and the interrupt request of the highest priority level is always determined by the interrupt controller. Therefore, the mediation result immediately prior to providing the interrupt vector in the interrupt reception bus cycle is significant.

Accordingly, the time at which an interrupt request at the newest highest priority level is determined can be delayed as far as possible, so that an interrupt process starting method can be provided for the data processing device whereby the response time for a high priority level interrupt request is shortened. Furthermore, by means of the present invention it is possible to provide a data processing device wherein the priority ranking mediation circuit in the interrupt controller is simplified, the amount of hardware required to make up the interrupt controller is reduced and, accordingly, the amount of electrical energy consumed is cut back.

I claim:

1. A data processing device, comprising:

input means for receiving an externally-supplied interrupt request with an interrupt priority signal indicative of one interrupt priority level from among a plurality of interrupt priority levels;

interrupt masking means for making interrupt requests, set either to not mask all interrupt requests at all priority levels among the plurality of interrupt priority levels, or set so that the interrupt requests from a low priority level to an optional priority level among the plurality of interrupt priority levels are ignored;

mask level storing means for storing a maximum interrupt priority level among the interrupt priority levels which are masked by the interrupt masking means; and control means for receiving a first interrupt priority signal of a first interrupt request transmitted from the input means, accepting the first interrupt request and initiating a first interrupt bus cycle for the first interrupt request, and thereafter, during the first interrupt bus cycle, receiving a second interrupt priority signal and an interrupt vector of a second interrupt request having a second interrupt priority level higher than that of a first interrupt priority level of the first interrupt request without initiating a second interrupt bus cycle.

wherein, before completion of the first interrupt bus cycle, the control means inputs the second interrupt priority level of the second interrupt request provided from the input means and sets the second interrupt priority level value in the mask level storing means as the mask level for an interrupt processing execution time, and instructs the interrupt masking means to mask interrupt requests with a priority level the same or lower than the second interrupt priority level newly received from the input means, when an interrupt is received at the same time as when the interrupt vector is accepted.

2. A data processing device as claimed in claim 1, wherein the control means further comprises:

means for receiving an interrupt request when the interrupt request received by and transmitted from the input means has a higher priority level than a mask level stored in the mask level storing means before completion of the first interrupt bus cycle; and means for accepting an interrupt vector which indicates the second interrupt priority level and executes receipt of an interrupt and identifies the origin of an interrupt request with a second interrupt priority level the same or higher than the first interrupt priority level before completion of the first interrupt bus cycle, wherein, before the completion of the first interrupt bus cycle, the interrupt vector accepting means inputs the second interrupt priority level and sets the second interrupt priority level in the mask level storing means as the mask level used during the interrupt processing execution time, and during the interrupt process execution time, instructs the interrupt masking means to mask interrupt requests with a priority level the same or lower than the second interrupt priority level, when an interrupt is received at the same time as when the interrupt vector is accepted.

3. A data processing device, comprising:

input means for receiving an interrupt request from outside the data processing device which is set at one interrupt priority level from among a plurality of interrupt priority levels;

interrupt masking means for masking interrupt requests, set either to not mask all interrupt requests at all priority levels among the plurality of interrupt priority levels, or set so that the interrupt requests from a low priority level to an optional priority level among the plurality of interrupt priority levels are ignored;

mask level storing means for storing a maximum interrupt priority level masked by the interrupt masking means; and control means for executing interrupt process by:

receiving a first interrupt request when a first interrupt priority signal of a first interrupt request transmitted from the input means is at a first interrupt priority level higher than a mask level maintained by the mask level storing means, executing an interrupt bus cycle; and accepting an interrupt vector which indicates a second interrupt priority level higher than the first interrupt priority level, before a completion of the interrupt receipt bus cycle, wherein the control means controls so that, before the completion of the interrupt receipt bus cycle execution and at the same time as the second interrupt vector is accepted, the interrupt priority level transmitted from the input means is input, the second interrupt priority level value is set in the mask level storing means as the mask level used during the interrupt processing execution, and interrupt requests with a priority level the same or lower than the second interrupt priority level, received during the interrupt process execution, are masked.

4. A data processing device, comprising:

input means for receiving an interrupt request from an interrupt controller which is set at one interrupt priority level from among a plurality of interrupt priority levels;

interrupt masking means for masking interrupt requests, set either to not mask all interrupt requests at all priority levels among the plurality of interrupt priority levels, or set so that interrupt requests from a low priority level to an optional priority level among the plurality of interrupt priority levels are ignored;

mask level register for storing a maximum interrupt priority level masked by the interrupt masking means; and control means for executing an interrupt process starting procedure by receiving a first interrupt request of a first interrupt priority level which is higher than a mask level held by the mask level register, starting a first interrupt reception bus cycle to output a first data representative of the first interrupt priority level to an interrupt controller via an address bus, receiving an interrupt vector of a second interrupt request on a data bus and receiving a second interrupt priority level without initiating a second interrupt bus cycle, the second interrupt request being at a second priority level which is higher than the first priority level, the interrupt vector and the second interrupt priority level being output from the interrupt controller in response to the first interrupt reception bus cycle, and replacing the mask level held in the mask level register with the second interrupt priority level, the second interrupt priority level being used as an updated mask level during the interrupt process execution.

* * * * *